United States Patent [19]

Levatter

[11] Patent Number: 4,891,818
[45] Date of Patent: Jan. 2, 1990

[54] RARE GAS-HALOGEN EXCIMER LASER

[75] Inventor: Jeffrey I. Levatter, Rancho Santa Fe, Calif.

[73] Assignee: Acculase, Inc., San Diego, Calif.

[21] Appl. No.: 322,567

[22] Filed: Mar. 13, 1989

Related U.S. Application Data

[63] Continuation-in-part of Ser. No. 233,957, Aug. 18, 1988, abandoned, which is a continuation of Ser. No. 91,383, Aug. 31, 1987, abandoned.

[51] Int. Cl.$^4$ .............................................. H01S 3/22
[52] U.S. Cl. ........................................ 372/57; 372/61; 372/103; 372/98
[58] Field of Search ....................... 372/61, 57, 65, 86, 372/98, 87, 107, 103

[56] References Cited

U.S. PATENT DOCUMENTS

| | | | |
|---|---|---|---|
| 4,099,143 | 7/1978 | Foster | 372/34 |
| 4,380,079 | 4/1983 | Cohn et al. | 372/83 |
| 4,567,597 | 1/1986 | Mandella | 372/34 |
| 4,571,730 | 2/1986 | Mizoguchi et al. | 372/58 |
| 4,611,327 | 9/1986 | Clark et al. | 372/86 |
| 4,718,072 | 1/1988 | Marchetti et al. | 372/86 |
| 4,719,641 | 1/1988 | Muller | 372/55 |

Primary Examiner—Léon Scott, Jr.
Attorney, Agent, or Firm—Pretty, Schroeder, Brueggemann & Clark

[57] ABSTRACT

A rare gas-halogen excimer laser in which the laser gases are exposed only to compatible materials that react with the laser gases to produce stable reaction products having a low vapor pressure, so as to reduce contamination of the gases and optics. High-purity nickel is the preferred material for components that are electrically conductive, and high-purity alumina is the preferred material for components that are non-electrically conductive. No non-compatible materials are used. In another feature, magnetic fluid seals are provided for the laser's fan-shaft, to isolate the shaft bearings and thereby isolate any non-compatible lubricant for the bearings. The fan uses magnetic coupling so that an isolating enclosure may be placed over the magnetic fluid seal to prevent the leakage of gases into the surrounding environment if the seal ever fails. In yet another feature of the invention, the excimer laser includes a window assembly that is movable and sized such that a succession of non-overlapping portions of it may be selectively fixed in the path of the exiting laser beam. An excimer laser that is both reliable, safe and long-lasting is thereby provided.

15 Claims, 2 Drawing Sheets

RARE GAS-HALOGEN EXCIMER LASER

CROSS-REFERENCE TO RELATED APPLICATIONS

This is a continuation-in-part of application Ser. No. 233,957, filed Aug. 18, 1988 and now abandoned, which is a continuation of application Ser. No. 091,383, filed Aug. 31, 1987 and now abandoned.

BACKGROUND OF THE INVENTION

1. Field of the Invention

The present invention relates to improvements in rare gas-halogen excimer lasers, and in particular, to improvements which increase the length of time, reliability and efficiency with which such lasers operate.

2. Background

An excimer laser uses a rare gas such as krypton, xenon, argon or neon, and a halide gas or a gas containing a halide, for example $F_2$ or HCl, as the active components. The active components and other gases are contained in a pressure vessel provided with laser optics at each end and longitudinally extending lasing electrodes for causing a transverse electrical discharge in the gases. The discharge causes the formation of excited rare gas-halide molecules whose disassociation causes the emission of ultraviolet photons constituting the laser light. The laser gases are circulated between the lasing electrodes by a fan and cooled by a heat exchanger within the pressure vessel.

Excimer lasers emit pulses of ultraviolet light radiation and have potentially many practical applications in medicine, industry and communications. This potential has remained to the most extent unfulfilled because of a number of problems that limit the length of time excimer lasers will operate without substantial maintenance or problems.

One of the problems encountered in efforts to achieve a practical excimer laser is the difficulty of obtaining a homogeneous volumetric discharge between the longitudinally extending lasing electrodes. Inhomogenous arcing between the electrodes causes their eventual destruction as well as contamination of the laser gases and optics with sputtered electrode material.

In order to overcome this difficulty, pre-ionization of the gas volume has been provided. This pre-ionization creates a low level electron cloud prior to the laser-exciting electrical discharge, and results in a homogeneous discharge. One type of pre-ionizer uses a non-solid, perforated, metallic longitudinally extending electrode separated from a co-axial ground electrode by an insulator. The pre-ionizer electrodes are co-axially situated within one of the lasing electrodes, which is made of conductive screen or mesh. The voltage applied to the pre-ionizer electrodes creates a plasma around the pre-ionizer electrodes which produces ultraviolet radiation. The ultraviolet radiation passes through the screen of the surrounding longitudinal lasing electrode to the area between the lasing electrodes and ionizes a portion of the gas there, allowing for a homogeneous discharge when an electric pulse is applied to the lasing electrodes. These additional components within the laser cavity are potential sources of contamination of the laser gases. Contamination of the laser gases during the operation of an excimer laser quenches the laser action.

Contamination of the laser gases or the optics in the pressure vessel requires that major maintenance and/or disassembly of the laser take place. Prior to the present invention, the lifetime of excimer lasers was on the order of a few tens of millions of pulses. It will be readily appreciated that at typical pulse rates between 10 and 500 pulses per second, the operating time between such maintenance procedures or disassembly is on the order of hours, rendering such excimer lasers impractical for many, if not most, applications. In addition, because the toxic and corrosive gases used in excimer lasers must be carefully handled during disassembly of the laser and subsequent reassembly, such procedures are neither simple or nonhazardous.

It is recognized by the present invention that contamination in excimer lasers arises from hydrocarbons, water vapor, fluorocarbons and other organic molecules and impurities and that the sources of such contaminants are many and varied. For example, the use of plastic supports for the longitudinal electrodes or as electrical insulators in the pressure vessel permits hydrocarbons and other molecules therein to contaminate the laser gases. Many parts in present day excimer lasers are either made of Teflon or have a Teflon coating on them or are made of epoxy resins, polyvinyl chloride, or other plastic materials. Teflon is perhaps the best of such materials because it is relatively inert to the corrosive effects of halogens while also being an electrical insulator. However, even Teflon and all the other plastic materials contaminate the excimer laser gases by virtue of the presence of hydrocarbon and/or fluorocarbon molecular structures. In addition to quenching the laser action, fluorocarbon or hydrocarbon molecular structures may be dissociated by ultraviolet radiation emitted from the gas discharge causing carbon or hydrocarbons to be deposited on the laser optics, which eventually destroys the laser output.

Another source of contamination arises from the use of a fan within the pressure vessel to circulate the laser gases. In particular, fluorocarbon grease or other lubricant used in connection with the bearings upon which the shaft of the fan rotates is a source of contaminants. The use of dry bearings for the fan shaft is not satisfactory as dry bearings have not proved to be sufficiently long-lived so as to be practical.

Additional problems arise from water vapor that may be introduced into the pressure vessel. The halide gases in the laser system form inherent metallic halides on the electrode surfaces. Water vapor from the air may gain entry into the pressure vessel as a result of maintenance procedures that take place after the laser gases are contaminated or the optics degraded. The metallic halides in the pressure vessel react with the water vapor to form highly corrosive compositions. For example, nickel fluoride and nickel chloride react with water vapor to form hydrofluoric acid and hydrochloric acid, respectively, which are corrosive substances that seriously degrade the materials used for the optical windows in the pressure vessel, e.g., quartz, calcium fluoride or magnesium fluoride.

Contamination within the pressure vessel, whether it is contamination of the laser gases which tends to quench the laser action or it is contamination of the optical windows on the pressure vessel, results in impractically short operating times between maintenance procedures. These maintenance procedures, which may involve changing the gases in the pressure vessel and cleaning and/or replacing the optical and other components in the pressure vessel are time consuming and costly. During the time that such procedures are taking place, the excimer laser is not available for use. In addition, the halogen gases used in excimer lasers and other gases that might be formed from impurities are highly toxic. When such gases have to be handled, such as during maintenance procedures, the possibility of their escape into the surrounding atmosphere is a safety hazard. The safety hazard is particularly critical if the excimer laser is utilized in medical procedures and is being serviced proximate to where such procedures take place.

SUMMARY OF THE INVENTION

It is a primary object of the present invention to provide an excimer laser that is capable of reliable operation over a longer period of time than has heretofore been achieved, and thereby to provide an excimer laser that is practical as well as safe for use in applications in medicine, industry, communications and other areas. In order to achieve this object, it is another object of the present invention to provide an excimer laser in which the contamination of laser gases and optics characteristic of prior excimer lasers is markedly reduced.

These and other objects of the present invention are achieved in an excimer laser that provides an environment for the laser gases in which the only materials exposed to the laser gases are those that react with the halogen gas to form stable reaction products having a vapor pressure of less than about $10^{-6}$ torr, at normal operating temperatures, e.g., about 20-30 degrees C. One suitable metal is high-purity nickel, and one suitable insulator is high-purity alumina ($Al_2O_3$). By restricting the access of the laser gases to such materials, contamination resulting from hydrocarbons, fluorocarbons and other organic materials that can quench the laser action or degrade the optics is eliminated.

In the present invention, the use of Teflon and similar halogen-reactive materials is avoided. The insulating support for the high voltage discharge electrode in the pressure vessel is fabricated of high-purity alumina, rather than Teflon or plastic. Similarly, a corona pre-ionizer uses an alumina insulator between its high voltage and ground electrodes.

In an independent feature of the present invention, the fan within the pressure vessel of the laser utilizes magnetic fluid seals to isolate the bearings supporting the fan shaft from the inside of the pressure vessel containing the laser gases. Contamination of the laser gases from the fan shaft bearings is thereby avoided, without increasing the risk of leakage of toxic laser gases into the environment. The bearings and any lubrication on them do not come in contact with the laser gases. An enclosure surrounds the bearing at the end of the shaft outside of the pressure vessel, as well as the side of the magnetic fluid seal facing the bearing, in order to contain laser gases that might leak through the seal in the event that the seal should fail. The fan is rotated by a magnetic coupling that includes an inner magnetic coupling portion on the fan shaft inside the enclosure and an outer magnetic coupling portion on a separate driven shaft coaxial with the fan shaft, exterior to the enclosure. By proper implementation of this enclosure, leakage of toxic laser gases into the environment may be prevented in the event that the magnetic fluid seal fails, with a margin of safety sufficient to meet the standards necessary for use in not only industrial, but also medical applications.

In another independent feature of the present invention, the need to service or replace the interior surfaces of the optical windows of the pressure vessel is reduced considerably. Such servicing or replacement requires a least partial disassembly of the laser, making it not only inefficient because of the unavailability of the excimer laser during such periods and the labor involved in servicing or replacing the windows, but also hazardous because of the necessary handling of toxic gases. To achieve a reduction in frequency of servicing or replacement of the windows, the present invention provides oversized windows in rotatable mounts. The windows are mounted so that the laser beam impinges and traverses the window through a portion of the window separated from the axis of its rotatable mount. The degradation resulting to windows used in excimer lasers from contamination occurs mainly where the beam impinges upon the window and is primarily due to photodecomposition and photoactivated surface attachment of hydrocarbons or fluorocarbons. When the portion of the window impinged upon by the laser beam has degraded to an extent sufficient to interfere with the desired operation of the excimer laser, the mount is rotated so that the laser beam impinges on a portion of the window not previously exposed to the beam. Depending on the relative placements and sized of the beam and the rotatable window, an increase of nearly an order of magnitude in the service life of the windows before disassembly and reassembly of the excimer laser becomes necessary is provided by the inclusion of this feature.

Other features and advantages of the present invention will become apparent from the following description of the preferred embodiment, taken in conjunction with the accompanying drawings, which illustrate, by way of example, the principles of the invention.

DESCRIPTION OF THE PREFERRED EMBODIMENT

The following description of a preferred embodiment of the present invention is presented for purposes of illustrating the principles of the present invention, and should not be taken in a limiting sense.

Figure 1:
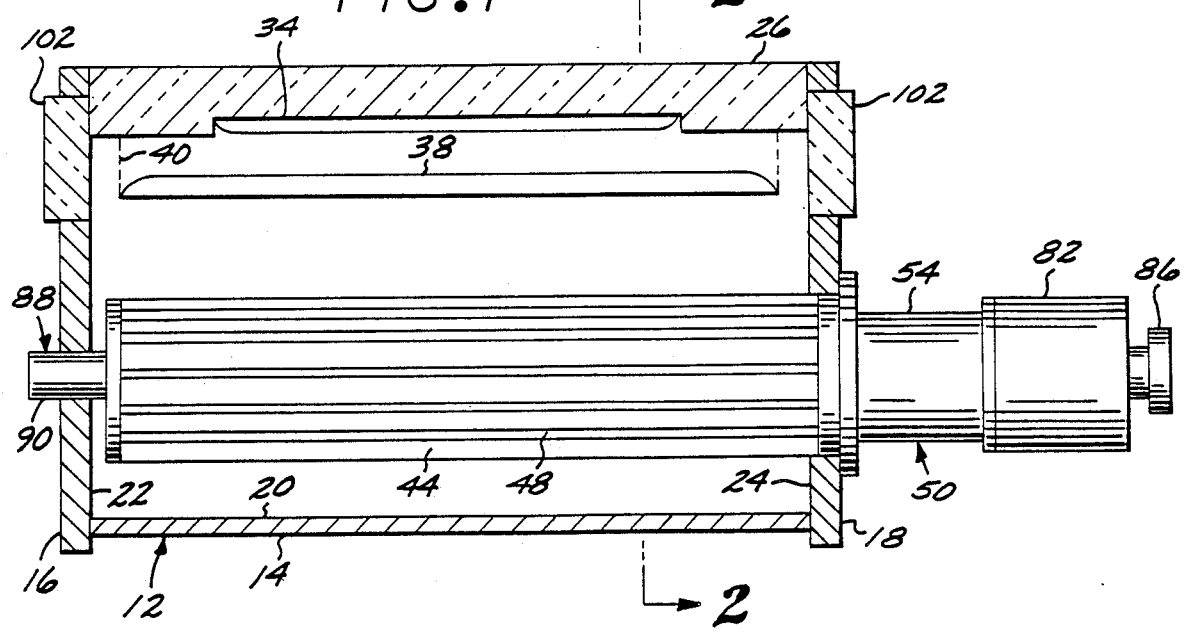
FIG. 1 is a schematic, lengthwise sectional view of a preferred embodiment of an excimer laser according to the present invention.
Figure 2:
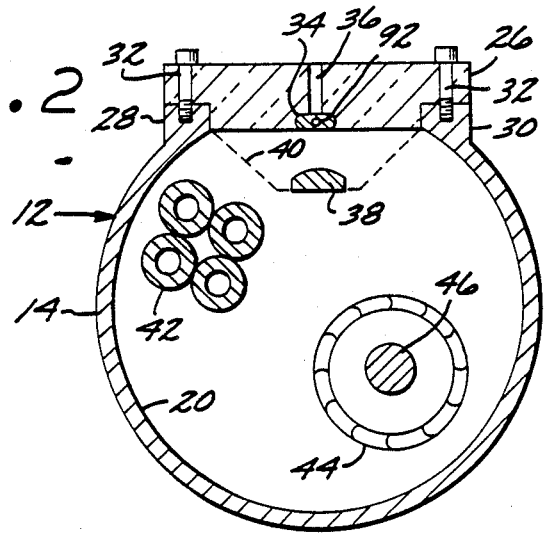
FIG. 2 is a schematic, cross-sectional view of the excimer laser shown in FIG. 1, taken along the lines 2—2 of FIG. 1.

With reference first to FIGS. 1 and 2, there is shown an excimer laser that includes a pressure vessel 12 for containing the laser gases and components of an excimer laser. The pressure vessel 12 is formed of a partially cylindrical longitudinal member 14 to which are attached first and second end plates 16 and 18. The longitudinal member 14 and the end plates 16 and 18 are, in the presently preferred embodiment, nickel-plated on their inside surfaces, i.e. surface 20 of longitudinal member 14 and surfaces 22 and 24 of the respective first and second end plates 16 and 18. The end plates 16 and 18 are attached to the longitudinal member 14 in any convenient manner that allows only nickel portions or nickel-plated portions of the end plates 16 and 18 and the member 14 to be exposed to the inside of the pressure vessel 12. Suitable openings and feed-throughs for various purposes, some of which will be described herein, are provided in end plates 16 and 18.

A ceramic cap member 26 formed of high-purity alumina ($Al_2O_3$) is secured by bolts 32 to flanges 28 and 30 provided along the longitudinal edges of longitudinal member 14, to complete the pressure vessel 12. These components, including the partially cylindrical longitudinal member 14, end plates 16 and 18 and the ceramic cap member 26 are configured and fitted together so that the pressure vessel 12 forms a container capable of safely holding the gases necessary for an excimer laser, which may be at a pressure between two and five atmospheres.

As mentioned above, a rare gas and a halide gas or a gas containing a halide are used in an excimer laser. In addition, other gases, e.g. helium, are also used in an excimer laser. The various openings and feed-throughs in the end plates 16 and 18 and the ceramic cap member 26 are, of course, utilized in such a manner that the requisite pressures can be maintained within the pressure vessel 12, with an adequate, applicable margin of safety. While the pressure vessel 12 may assume various configurations in the present invention, the laser gases in the pressure vessel 12 are exposed virtually only to high-purity nickel and high-purity alumina. The halogen gas reacts with these materials very slowly, to produce stable passivation layers that, themselves, are inert to the halogen gas. Minimal contamination of the laser gases therefore arises.

Alternative materials to the preferred high-purity nickel and high-purity alumina include any materials that react with a halogen gas to produce reaction products that are stable (i.e. do not flake off) and that have a low vapor pressure of less than about $10^{-6}$ torr, at normal operating temperatures, e.g., about 20-30 degrees C. Silver and gold are alternative materials to nickel, but they are not considered as desirable, because of their poorer mechanical strength and increased expense. In addition, in the case of gold, care must be taken to eliminate from the vessel all water vapor, because of its high reactivity with gold. Electrically-conductive materials that have been commonly used in the past within the pressure vessel of excimer lasers, but that do not meet this criteria for compatibility, include stainless steel, aluminum, molybdenum, tantalum and tungstun. Non-electrically conductive materials that have been commonly used in the past within the pressure vessel of excimer lasers, but that do not meet this criteria for compatibility, include silicon, carbon, Teflon, Kynar, epoxy and many ceramics.

The ceramic cap member 26 serves as a support for a first laser discharge electrode 34 and insulates the first discharge electrode 34 from the longitudinal member 14 of the pressure vessel 12, which is grounded. Feed-throughs 36 are provided in the ceramic cap member 26, to electrically connect a high voltage power source external to pressure vessel 12 to the first laser discharge electrode 34. The first discharge electrode 34 is preferably made of a metal mesh or screen, for purposes explained below with respect to a pre-ionizer structure 92. The second laser discharge electrode 38 is supported in pressure vessel 12 by an alumina ceramic spacer so as to be separated from the first discharge electrode 34. The space between first and second laser discharge electrodes 34 and 38 defines the area in the pressure vessel 12 where lasing action occurs. The second laser discharge electrode 38 is grounded to the pressure vessel 12 by means of a current return screen 40. The first and second laser discharge electrodes 34 and 38 and the current return screen 40 may be of conventional configuration.

The laser gas used in the preferred excimer laser of the present invention may be the same as has been previously used in excimer lasers, although it is within the scope of the present invention that other gases and combinations of gases for excimer lasers not necessarily heretofore used or proposed can be used.

Because the gases of an excimer laser become heated during the lasing action, a heat exchanger 42 is provided in the pressure vessel 12, as shown in FIG. 1. The heat exchanger 42 extends along the entire length of the pressure vessel 12, but is omitted for simplicity from FIG. 2. The surface of the portions of the heat exchanger 42 in contact with the laser gases in the pressure vessel 12 are preferably formed of nickel. The heat exchanger 42 may otherwise be of conventional design and configuration.

The laser gases are circulated through the pressure vessel 12 by a tangential fan 44 supported by a fan shaft 46. The portions of tangential fan 44 and fan shaft 46 in contact with the laser gases are preferably high-purity nickel or high-purity alumina. The blades 8 of the tangential fan 44 are located around the shaft 6, as is conventional. Unlike conventional tangential fans, however, the tangential fan 44 is provided with bearings and a drive mechanism for the fan shaft 46 that are isolated from the laser gases in the pressure vessel 2 and therefore cannot contaminate the gases. These bearings and drive mechanism are described in detail below, with reference to FIG. 4.

Figure 4:
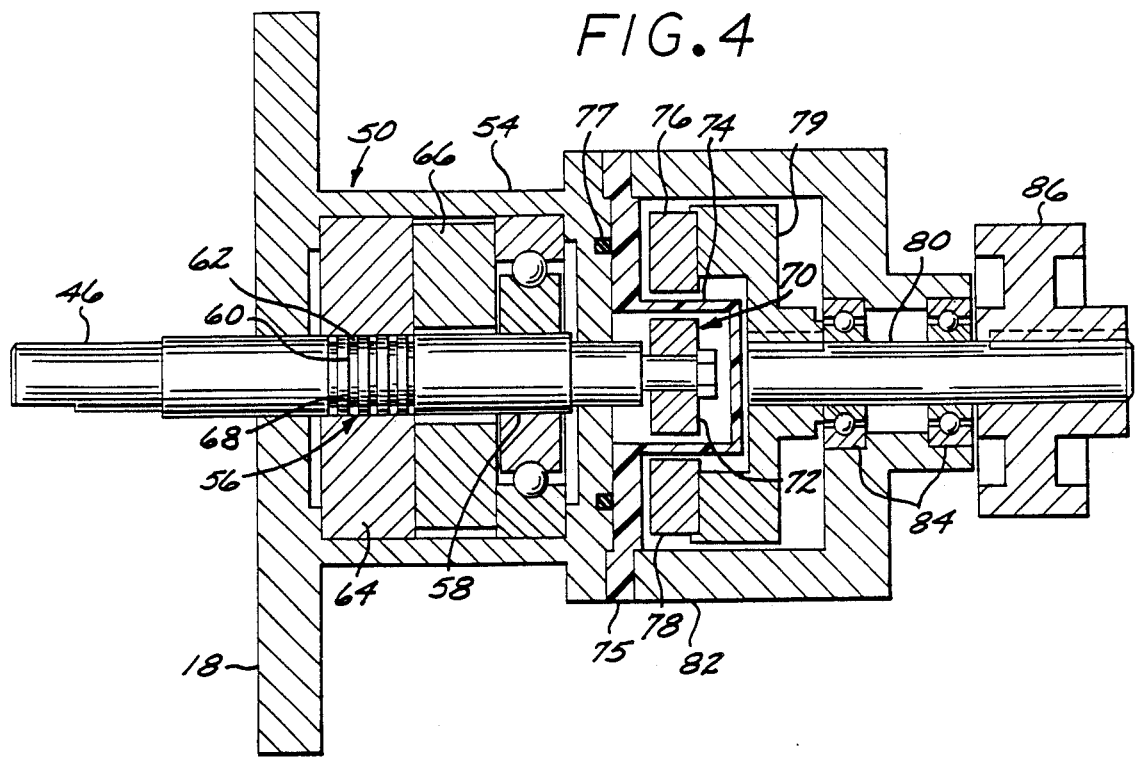
FIG. 4 is a sectional view of a magnetic fluid seal and bearing for the fan shaft of the excimer laser of FIG. 1 and the magnetic drive components used to rotate the fan.

Referring now to FIG. 4, a magnetic fluid seal assembly 50 and a magnetic drive assembly 52 are shown in a preferred embodiment. The magnetic fluid seal assembly 50 comprises a housing 54 that contains a magnetic fluid seal 56 and bearing 58. The bearing 58 is supported by the housing 54 and it, in turn, rotatably supports the fan shaft 46. The portion of the fan shaft 46 within the magnetic fluid assembly 50 is actually a specially-machined shaft that is attached within pressure vessel 12 coaxially to the portion of the shaft that rotates the fan 44. For ease of description and in the claims, contiguous coaxial shaft portions will not be differentiated and will be referred to as a single shaft and may be a single shaft.

The magnetic fluid seal 56 is located in the housing 54, between the bearing 58 and the pressure vessel 12, and it utilizes a section 60 of the fan shaft 46 having spaced circumferential grooves 62. Adjacent the shaft section 60, but not in contact with it, is an annular pole piece 64 whose outer circumference is sealed to the inside of the housing 54. A permanent magnet 66 also is annularly disposed around shaft 46, immediately adjacent the pole piece 64. A fluid 68 containing microscopic-sized particles of magnetic material is disposed in the area of the grooves 62, between the shaft section 60 and the pole piece 64. The fluid 68 is contained in the area of the shaft section 60 by the magnetic force of the permanent magnet 66 and the pole piece 64. The magnetic fluid 68 forms a fluid seal between the shaft 46 and the pole piece 64 at the shaft section 60. Magnetic fluid seals of this type are well known and further details of their construction and operation are readily available. Seals of this type, for example, are marketed as Ferrofluidic seals by Ferrofluidic Corporation of Nashua, N.H. Such seals can conventionally withstand pressure differentials of on the order of 60 psi.

The bearing 58 is located adjacent the permanent magnet 66 and, because it is sealed from the laser gases in the pressure vessel 12 by the magnetic fluid seal 56, may employ lubrication without the risk of the lubrication contaminating the laser gases in the pressure vessel 12.

The end of the shaft 46 extends beyond the bearing 58 and beyond the end of the housing 54, through an opening therein, to accommodate a portion of the attached magnetic drive assembly 52. An inner magnetic coupling 70 comprises a circular array of magnets 72 with adjacent magnets 72 being of alternate polarities. A pressure cap 74 made of non-magnetically shielding material is placed over the inner magnetic coupling 70 and sealingly attached along flange 75 to the housing 54 with the assistance of an O-ring 77. The inside of pressure cap 74 is in fluid communication with the inside of housing 54 on the bearing 58 side of the magnetic fluid seal 56, and it is attached to housing 54 so as to be able to withstand internal pressures equal to several times the pressures normally achieved by the laser gases in the pressure vessel 12. In the event that the magnetic fluid seal 56 fails and toxic laser gases are thereby introduced into the side of the seal housing 54 on which the bearing 58 is located, such toxic laser gases will be contained by the pressure cap 74, with a margin of safety that may be required by applicable safety standards.

A corresponding outer magnetic coupling 76 comprising a large diameter circular array of magnets 78 of alternating polarities is located concentric to the inner magnetic coupling 70 and in magnetic flux-coupling proximity thereto, but outside of pressure cap 74. Magnetic couplings of this type are well known and a more detailed description of their construction is not believed necessary. The outer magnetic coupling 76 is attached by a suitable annular member 79 to a shaft 80 that is external to the pressure cap 74, but coaxial with the fan shaft 46. A magnetic drive housing 82 attached to the flange 75 of the pressure cap 74 and the seal housing 54 protects the outer magnetic coupling 76 from dirt and dust and also supports bearings 84 in which the shaft 80 rotates. A pulley 86 attached to the shaft 80 connects the shaft 80 to a means for rotating the shaft, such as a motor. It will be appreciated that as the shaft 80 is rotated, thereby rotating the outer magnetic coupling 76, the rotation of the outer magnetic couplings 76 causes the inner magnetic coupling 70 to also be rotated, thereby rotating the fan shaft 46 and the fan 44.

At the opposite end of the tangential fan 44 is located a second magnetic fluid seal assembly 88, as indicated in FIG. 1. The second magnetic fluid seal assembly 88 comprises a seal housing 90 that contains a bearing and a magnetic fluid seal around the end of the fan shaft 46 of a construction similar to that described above with respect to the first magnetic fluid seal assembly 50. However, because that end of the fan shaft 46 need not be driven, the fan shaft 46 may terminate within the seal housing 90, thereby eliminating the need for a separate pressure cap such as pressure cap 74 used in connection with the first magnetic fluid seal assembly 50. The second magnetic fluid seal assembly 88 is, in the preferred embodiment, physically smaller than the first magnetic fluid seal assembly 50.

The preferred embodiment of the present invention uses a corona pre-ionizer 92 in order to generate a low level electron cloud between the first and second discharge electrodes 34 and 38, which is desirable for insuring a homogeneous discharge in the excimer laser. The corona pre-ionizer 92, in the preferred embodiment, is located within the first laser discharge electrode 34, which as noted previously is preferably made of mesh or screen to permit the electron cloud formed by the pre-ionizer 92 to be generated between the discharge electrodes.

Figure 3:
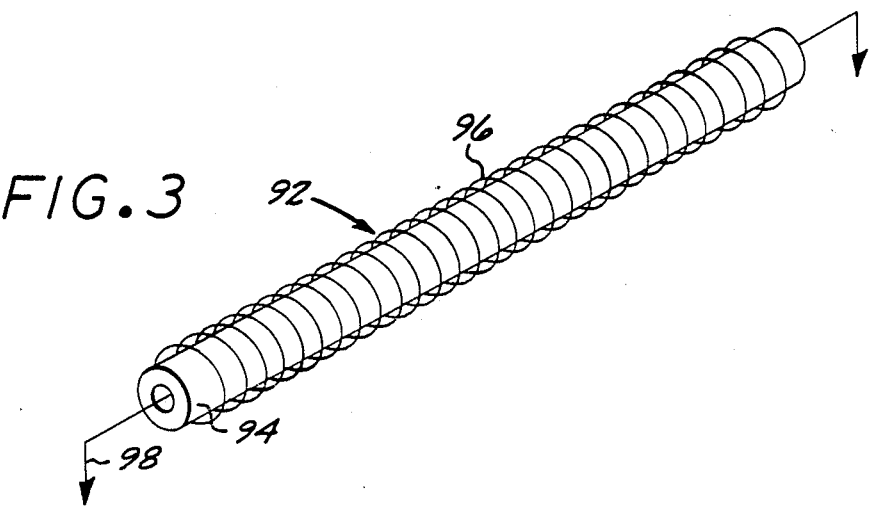
FIG. 3 is a perspective view of a preferred embodiment of a pre-ionizer that can be used in the excimer laser of FIG. 1.

The structure of the pre-ionizer is shown more particularly in FIG. 3. The corona pre-ionizer 92 comprises a tubular ceramic insulator 94 which extends the length of the first laser discharge electrode 34. Preferably, the tubular ceramic insulator 94 is fabricated of high-purity alumina. A helical wire 96 wrapped about the tubular ceramic insulator 94 serves as a high voltage electrode for the pre-ionizer 92. The wire 98 along the bore 100 of the tubular ceramic insulator 94 is the ground electrode. The corona pre-ionizer 92 of the present invention need not use a ceramic insulator that is tubular in shape. Other shapes of ceramic insulators may be used, e.g. a flat disk. Similarly, perforated electrodes rather than a helical wire may be used.

The present invention, in addition to reducing the sources of contamination of the laser gases and the optical surfaces within the pressure vessel 12, also provides window assemblies 102 for the optical windows of the laser cavity that necessitate far fewer replacements of the windows. The removal and replacement of optical components after they have degraded involves the removal and filling of the laser cavity with the toxic laser gases. With the present invention, the window assembly 102 for holding an optical component 104 at each end of the laser cavity provides the capability of rotating the optical component so that different portions of it can be presented to the laser beam generated in the pressure vessel 12 between the first and second laser discharge electrodes 34 and 38, without removing the assembly 102 and consequently without removing and refilling the pressure vessel 12 with the laser gases.

Figure 5:
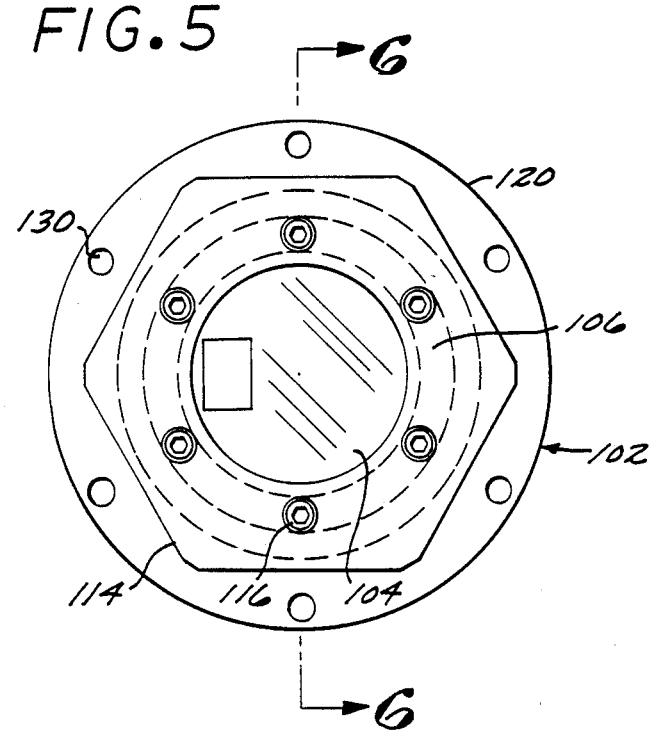
FIG. 5 is a plan view of a preferred embodiment of a window assembly for the excimer laser of FIG. 1.
Figure 6:
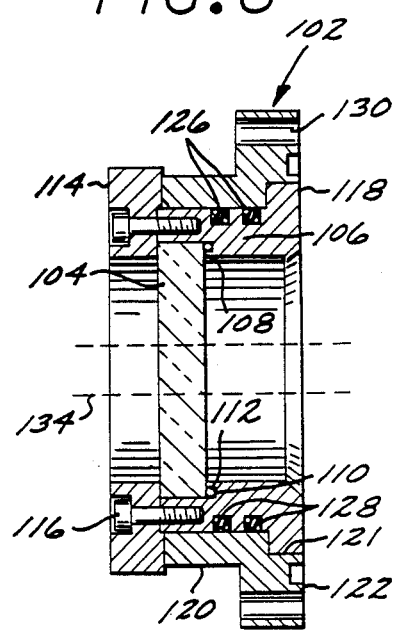
FIG. 6 is a cross-sectional view of the preferred embodiment of the window assembly shown in FIG. 5, taken along the lines 6—6 in FIG. 5.

A preferred embodiment of a window assembly 102 in which the optical component 104 is rotatable to move different portions of it into the path of the laser beam will now be described with reference to FIGS. 5 and 6. An annular sleeve 106 having an interior shoulder 108 is provided for mounting the optical component 104. The optical component 104 and the interior diameters of the sleeve 106 above and below the shoulder 108 are sized so that the optical component 104 abuts an O-ring 110 disposed in a groove 112 on a shoulder 108. Lateral movement of the optical component 104 is restricted by the sleeve 106. An annular ring 114 with a hexagonal periphery is secured over the peripheral edge of the optical component 104 by bolts 116, so that the optical component 104 is securely held between the shoulder 108 of the sleeve 106 and the annular ring 114. Each optical component 104 is oversized, having an area sufficient to accommodate several non-overlapping laser beams. Completely different portions of the optical component 104 may therefore be successively interposed into the path of the laser beam.

The annular sleeve 106 is provided with a flange 118 for holding the window mount 120 between the sleeve 106 and the annular ring 114. The window mount 120 is of annular configuration and has a circumferential notch 121 along its inside, at the beginning of a mounting flange 122, that accommodates the flange 118 of the sleeve 106. In addition, the inside cylindrical surface of the window mount 120 is sized to slide over the outside surface of the sleeve 06 and to seal against it by means of quad rings 126 formed of Viton, which are disposed in circumferential grooves 128 located on the outside of the sleeve 106. The window mount 120 is slipped over the sleeve 106 prior to the securing of the annular ring 114 by bolts 16 to the annular sleeve 106. The window mount 120 and the secured sleeve 106 and the ring 114 holding optical component 104 are thereby rotatably secured together, the Viton rings 126 allowing rotation while at the same time providing sealing. Bolts through bores 130 in the mounting flange 122 on the window mount 120 are used to secure each window assembly 102 to an end plate 22 or 24 over an opening therein so that a portion 132 of the optical component 104, not including the center portion, is presented to the laser beam 134.

The portion 132 of the optical component 104 presented to the laser beam 134 may be changed by rotating the annular ring 114 by its hexagonal periphery and thereby the optical component 104. It will be appreciated that there are many other configurations and arrangements that may be used in order to provide an optical component for each end of an excimer laser that is rotatable to place a different portion of the optical component into the path of the beam without the necessity for removing the window.

In the preferred embodiment, the window assemblies 102 are used in conjunction with external mirrors (not shown in the drawings) that define the laser cavity. One of the mirrors is partially transmitting, so that the generated laser beam can escape the cavity and be used. It will be appreciated that these external mirrors could be eliminated by appropriately coating the optical components of the window assemblies so as to make one of them reflective and the other partially reflective.

The portions of the window assemblies 102 that are in contact with the laser gases, with the exception of the optical components 104, are formed entirely of a compatible metal such as high-purity nickel or ceramic such as high-purity alumina. All of the remaining portions of other components of the excimer laser that are exposed to the laser gases are likewise formed of similar materials. Consequently, very little reaction with the halogen gas occurs and contamination of the gas and of the optical components 104 occurs. The optical components 104, themselves, are preferably formed of highly-polished quartz ($SiO_2$). Although the silicon in the quartz is highly reactive with the halogen gas, this reaction is minimized by polishing the quartz to a flatness of preferably less than about 20–30 Angstroms, rms. In this condition, where the window is isolated from any electron or other ion bombardment and from any high-voltage stress, the quartz is substantially inert.

The foregoing description has been of a certain presently preferred embodiment of the present invention. It will be appreciated by those skilled in the art that there are many modifications and variations of these described embodiments that remain within the scope of the present invention as claimed.

I claim:

1. In an excimer laser of the type in which a halogen gas is contained in a pressure vessel containing first and second electrodes for creating a laser discharge between the electrodes and generating a laser beam between first and second optical components at opposite end of the pressure vessel, a fan for circulating the gases, and a heat exchanger for cooling the gases, an improvement wherein the portions of the pressure vessel, first and second electrodes, fan and heat exchanger that are in contact with the halogen gas are fabricated entirely of a material that reacts with the halogen gas to form stable reaction products having a vapor pressure of less than about $10^{-6}$ torr, at normal operating temperatures, such that contamination of the gas by said pressure vessel, first and second electrodes, fan and heat exchanger is minimized and the lifetime of the excimer laser is increased.

2. An improved excimer laser as defined in claim 1, and further including a pre-ionizer located within said pressure vessel, for ionizing a portion of the halogen gas contained therein, wherein each portion of the pre-ionizer that is in contact with the halogen gas is fabricated entirely of a material that reacts with the halogen gas to form stable reaction products having a vapor pressure of less that about $10^{-6}$ torr, at normal operating temperatures.

3. An improved excimer laser as defined in claim 1, wherein all non-electrically conductive portions of the pressure vessel, first and second electrodes, fan and heat exchanger that are exposed to the halogen gas are formed of high-purity alumina.

4. An improved excimer laser as defined in claim 1, wherein all electrically-conductive portions of the pressure vessel, first and second electrodes, fan and heat exchanger that are exposed to the halogen gas are formed of high-purity nickel.

5. An improved excimer laser as defined in claim 1, wherein each of said first and second optical components is movable and sized so that a succession of non-overlapping portions of said optical component may be selectively fixed in the path of the laser beam.

6. An improved excimer laser as defined in claim 5, and further including a window assembly for carrying each of said optical components, each window assembly comprising:

a first annular member for carrying said optical component;

a second annular member concentric with said first annular member for sealing attachment to said pressure vessel; and means for rotatably and sealingly securing said first and second annular members so that said first annular member may be rotated with respect to said second annular member while maintaining a seal between said first and second annular members.

7. An improved excimer laser as defined in claim 1 and further comprising:

a fan shaft upon which said fan rotates extending through said pressure vessel;

a bearing located external to said pressure vessel supporting said fan shaft;

a magnetic fluid seal surrounding said fan shaft and separating the inside of said pressure vessel from said bearing, to prevent the halogen gas within said pressure vessel from contacting said bearing and any lubrication associated with said bearing; and an enclosure located over said bearing and the portion of said fan shaft extending through said pressure vessel and over the side of said magnetic fluid seal facing said bearing, to prevent the escape of halogen gas to the atmosphere if said magnetic fluid seal fails and the halogen gas from said pressure vessel enters said enclosure.

8. An improved excimer laser as defined in claim 7 and further comprising a magnetic coupling for rotating said shaft, said magnetic coupling including:
an inner magnetic coupling portion attached to said fan shaft;
an outer magnetic coupling portion; and
a drive shaft attached to said outer magnetic coupling portion and located external to said pressure vessel and said enclosure and coaxial with said fan shaft, said outer magnetic coupling portion being located in magnetic flux coupling proximity to said inner magnetic coupling portion so that said magnetic coupling causes said fan shaft to rotate when said drive shaft is rotated.

9. An excimer laser comprising:
a pressure vessel containing a halogen gas,
first and second electrodes located within the pressure vessel, for exciting the gas located there between and generating a laser discharge;
first and second optical means located at opposite ends of the pressure vessel, aligned with the space between the first and second electrodes, for generating a laser beam there between; and
a fan for circulating the gases, wherein the fan includes
a fan shaft extending through said pressure vessel,
a bearing located external to said pressure vessel, for supporting said fan shaft,
a magnetic fluid seal surrounding said fan shaft and separating the inside of said pressure vessel from said bearing, to prevent the halogen gas within said pressure vessel from contacting said bearing and any lubrication associated with said bearing; and,
and
an enclosure located over said bearing and the portion of said fan shaft extending through said pressure vessel and over the side of said magnetic fluid seal facing said bearing, to prevent the escape of halogen gas to the atmosphere if said magnetic fluid fails and the halogen gas from said pressure vessel enters said enclosure.

10. An excimer laser as defined in claim 9, and further comprising a magnetic coupling for rotating said shaft, said magnetic coupling including:
an inner magnetic coupling portion attached to said fan shaft;
an outer magnetic coupling portion; and
a drive shaft attached to said outer magnetic coupling portion and located external to said pressure vessel and said enclosure and coaxial with said fan shaft, said outer magnetic coupling portion being located in magnetic flux coupling proximity to said inner magnetic coupling portion so that said magnetic coupling causes said fan shaft to rotate when said drive shaft is rotated.

11. An excimer laser comprising:
a pressure vessel containing a halogen gas;
first and second electrodes located within the pressure vessel, for exciting the gas located therebetween and generating a laser discharge; and
first and second optical means located at opposite ends of the pressure vessel, aligned with the space between the first and second electrodes, for generating a laser beam therebetween;
wherein said first optical means includes
an optical component on which the laser beam impinges, the optical component
being sized substantially larger than the beam's cross-section, and
mounting means for selectively moving the optical component relative to the laser beam and fixing a selected portion of the optical component in the beam's path, such that any portions of the optical component carrying undesired deposits of light-absorbing particles may be selectively moved out of the beam's path.

12. An excimer laser as defined in claim 11, wherein:
the optical component of said first optical means is an annular window; and
said first optical means further includes
a first annular member for carrying said optical component,
a second annular member concentric with said first annular member for sealing attachment to said pressure vessel, and
means for rotatably and sealing securing said first and second annular members so that said first annular member may be rotated with respect to said second annular member while maintaining a seal between said first and second annular members.

13. A method for using an excimer laser of a kind that includes a pressure vessel containing a halogen gas, first and second electrodes located within the pressure vessel for exciting the gas located therebetween and generating a laser discharge, and first and second optical means located at opposite ends of the pressure vessel, aligned with the space between the first and second electrodes, for generating a laser beam therebetween, wherein the first optical means includes an optical component on which the laser beam impinges that is laterally movable relative to the beam, the method comprising steps of:
operating the excimer laser such that, after a period of operation, a film of light-absorptive particles is deposited on the optical component of the first optical means, with a denser film being deposited on the portion of the optical component on which the laser beam impinges; and
selectively moving the optical component of the first optical means laterally relative to the laser beam, to bring a portion of the optical component carrying a less dense deposited film into alignment with the beam.

14. A method as defined in claim 13, wherein:
the optical component of the first optical means is an annular window;
the first optical means further includes
a first annular member for carrying said optical component,
a second annular member concentric with said first annular member for sealing attachments to said pressure vessel, and
means for rotatably and sealingly securing said first and second annular members so that said first annular member may be rotated with respect to said second annular member while maintaining a seal between said first and second annular members; and
the step of selectively moving includes a step of rotating the first annular member relative to the second annular member.

15. A method as defined in claim 14, wherein:
the second optical means includes an annular window on which the laser beam impinges, the window being sized greater than the beam cross-section and being laterally movable relative to the beam, wherein operation of the excimer laser, after a period of time, deposits a film of light-absorptive particles on the annular window of the second optical means, with a denser film being deposited on the portion of the annular window on which the laser beam impinges, a first annular member for carrying said optical component, a second annular member concentric with said first annular member for sealing attachment to said pressure vessel, and means for rotatably and sealingly securing said first and second annular members so that said first annular member may be rotated with respect to said second annular member while maintaining a seal between said first and second annular members; and the method further includes a step of selectively rotating the first annular member of the second optical means relative to the second annular member of the second optical means, to bring a portion of the annular window carried by the first annular member carrying a less dense deposited film into alignment with the beam.

* * * * *